United States Patent Office 3,274,264
Patented Sept. 20, 1966

3,274,264
FLUORODINITROALKANE PREPARATION
Mark Graff, William E. McQuistion, and James W. Sterling, Washington, D.C., assignors to the United States of America as represented by the Secretary of the Navy
No Drawing. Filed Nov. 12, 1964, Ser. No. 410,835
7 Claims. (Cl. 260—644)

The invention described herein may be manufactured and used by or for the Government of the United States of America for governmental purposes without the payment of any royalties thereon or therefor.

PROLOGUE

This invention relates to the continuous fluorination of aliphatic compounds and, in particular, is directed to the continuous aqueous fluorination of 1,1-dinitroalkanes.

It is known that 1-halo-1,1-dinitroalkanes may be prepared by the reaction of a salt of the 1,1-dinitroalkane with a fluorinating agent such as perchloryl fluoride or by the direct halogenation of an aqueous solution of the 1,1-dinitroalkane salt. Heretofore, these products have been prepared only by batch processes and have been attended with certain disadvantages. For example, the use of these materials in a batch reactor is conducive to the build-up of large amounts of sensitive reactants in the reactor with the concomitant hazards attendant therein. Moreover, in a batch reaction, temperature control is difficult and competing reactions occur such as the reaction between gaseous halogens with the 1,1-dinitroalkane anion and/or the reaction of gaseous halogens with sodium hydroxide which is usually employed in these processes to maintain a necessary alkaline condition. These undesired competing and side reactions occur because of the duration of time which the reactants must be maintained in the batch reactor to insure at least a minimum yield. Moreover, a batch reaction because of possible pressure build-up is hazardous and wasteful of materials.

PURPOSE OF THE INVENTION

The purpose of this invention is to provide a continuous method for fluorinating 1,1-dinitroalkanes in order to overcome the disadvantages attendant in the methods of fluorination previously known in the art.

Accordingly, it is an object of this invention to provide a method for the continuous fluorination of 1,1-dinitroalkanes in which no organic solvent is required during reaction, thereby eliminating laborious and often expensive work-up procedures.

A further object of the invention is the provision of a continuous aqueous fluorination process which is effected with a minimum amount of reagents and is productive of high yields of high quality product.

Still another object of the invention is to provide a fluorination method wherein the reagents used are readily available and of moderate cost.

A further object of the invention is the provision of a fluorination process which is an outstandingly safe method for the preparation of sensitive materials.

DESCRIPTION OF THE PROCESS

The process of the invention comprises the simultaneous feeding of a stream comprising an aqueous solution of an alkali metal salt of a dinitroalkane and a stream comprising a gas mixture comprising an inert gas and gaseous fluorine into an agitated reactor equipped with an overflow tube connecting with a receiver.

The following examples are intended to illustrate an embodiment of the process of the invention but should not be construed as a limitation upon the scope thereof.

Example I

This example illustrates the preparation of 1-fluoro-1,1-dinitroethane by the reaction of 1-sodium-1,1-dinitroethane with gaseous fluorine. The reactants were simultaneously fed to the reactor in twin streams.

In a stainless steel tank of 34,440 cc. capacity there was premixed fluorine and nitrogen in a ratio of 1:4. The reactor was a 500 cc., 3-necked Morton flask fitted with a thermometer, sparger, mechanical stirrer and a sidearm overflow leading to a receiver. The exit gas was led into a trap containing an aqueous potassium iodide solution. Sodium dinitroethane solution (0.1029 g./ml.), containing 10% excess sodium hydroxide, was metered into the flask by a Lapp LD–10 Pulsafeeder pump at a rate of 2.8 ml. per minute. Concurrently, the fluorine-nitrogen mixture was added at a rate of 250 ml./minute. During 4.5 hours, 0.56 mole of sodium dinitroethane and 0.614 mole of fluorine was added. The temperature range was maintained at about 4–8° C. by cooling with a salt-ice bath. The reaction mixture continuously overflowed into the receiver where the oily product separated from the waste aqueous base. After flushing the reactor with nitrogen, the reaction mixture was made alkaline to pH 9 with 10 percent sodium hydroxide and agitated an additional 10 minutes. Next, an amount of Arochlor equal in volume to the crude oily product was charged and the mixture was vigorously agitated for 15 minutes. After separating the Arochlor extract, the reaction mixture was rinsed with approximately twice its volume of distilled water. Finally the product was obtained by flash distilling the Arochlor extract at 0.5–1 mm. pressure in a bath temperature of about 40° C. The high boiling Arochlor acted as a chaser and desensitizer.

In lieu of 1-fluoro-1,1-dinitroethane, there may be prepared other aliphatic halodinitroalkanes in the same manner as outlined in Example I. For instance, by the reaction of the alkali metal salts of dinitroethane, dinitropropane and dinitrobutane with fluorine gas there may be prepared the corresponding halodinitromethane, halodinitropropane and halodinitrobutane. Although the sodium salt of the dinitroalkane is preferably used because of the solubility characteristics inherent therein, other alkali metal salts may be used in lieu thereof. Further, the aliphatic dinitroalkanes which may be prepared by the method of this invention are not limited to the lower aliphatic dinitroalkanes. The length of the aliphatic chain is limited only by the solubility of the particular dinitroalkane salt in the aqueous phase and the fact that the dinitro group must be on a terminal carbon atom. Thus the presence of the terminal dinitro group activates the remaining hydrogen atom on the terminal carbon, thus allowing the fluorination replacement to occur.

Examples II through V

The procedure of Example I was repeated in a number of experiments wherein the percent excess sodium hydroxide was varied. The results of these experiments are given in Table I below.

TABLE I

| Example | Excess Percent NaOH | Percent Yield |
|---|---|---|
| II | 25 | 63 |
| III | 50 | 72 |
| IV | 75 | 63 |
| V | 100 | 73 |

The crude 1-halo-1,1-dinitroalkane may be readily isolated from the reaction mass by any one of several known methods. Preferably, the crude oily product is isolated as above by extraction with Arochlor, a polychlorinated diphenyl compound, and after adjusting the reaction mixture to an alkalinity of at least pH 8, the lower layer containing the product is separated from the aqueous upper layer containing the unreacted alkali metal dinitroalkane. Then, as above, the extract is washed free of alkali with distilled water, dried, and the desired product is flash distilled from the Arochlor. As illustrated in the examples, a successful fluorination of the alkali metal dinitroalkane requires an excess of alkali metal hydroxide, such as sodium hydroxide or potassium hydroxide. Runs containing 10 to 100% excess caustic yield the desired product of equal quality, but conversion is favored in the direction of higher basicity. Preferably, an excess of from about 10–25% sodium hydroxide is employed.

The reaction temperature may be varied over a range of from about −5° C. to about 15° C. Lower reaction temperatures require expensive cooling equipment and result in low conversion rates, while high temperatures promote oxidation and unwanted side reactions. The preferable temperature range in terms of results as regards both yield and quality of product is obtained when the reaction temperature is maintained between about 0° and about 10° C.

The alkali metal dinitroalkane solution concentration may be used in strengths of about 5–20% by weight. In the case of sodium dinitroethane, the solution strength was about 10% as delivered from a plant production process.

The mole ratio of inert gas to gaseous fluorine may be varied from about 2:1 to 6:1. More concentrated fluorine mixtures should be avoided in order to prevent possible product fragmentation. More dilute fluorine concentrations would require too long a residence time and thus increase the explosion hazard. The rate of feed of the alkali metal dinitroalkane and the gas mixture should be monitored to maintain the temperature within the prescribed limits and the pH of the reaction should be maintained alkaline. Preferably the feed should allow a slight excess of the alkali metal dinitroalkane. Inert gases which may be used include nitrogen, helium, and argon.

The equipment used in carrying out the invention is of conventional design and is readily available. It may be fabricated of acid resistant material, i.e., stainless steel, Monel, or glass. An efficient means for cooling the reaction vessel should be provided such as, for example, a cooling jacket or immersed coil.

Obviously, many modifications and variations of the present invention are possible in the light of the above teachings. It is therefore to be understood that within the scope of the appended claims, the invention may be practiced otherwise than as specifically described.

Having thus described the invention, what is claimed and desired to be secured by Letters Patent of the United States is:

1. The method for preparing fluorodinitroalkanes which comprises continuously and concurrently feeding a stream comprising an aqueous solution of an alkali metal salt of a dinitroalkane and a stream comprising a gas mixture comprising an inert gas and gaseous fluorine into a reactor, allowing said dinitroalkane salt and said gas mixture to react under alkaline conditions and continuously withdrawing a fluorodinitroalkane product.

2. The method of claim 1 wherein said alkali metal is selected from the group consisting of sodium and potassium.

3. The method of claim 1 wherein said dinitroalkane is selected from 1,1-dinitromethane, 1,1-dinitroethane, 1,1-dinitropropane and 1,1-dinitrobutane.

4. The method of claim 1 wherein said inert gas is nitrogen.

5. The method of claim 1 wherein the mole ratio of inert gas to gaseous fluorine is about 2:1 to 6:1.

6. The method of claim 1 wherein the reaction temperature is maintained at about −5° to about 15° C.

7. The method of claim 1 wherein said alkaline conditions are maintained by the presence of an excess of alkali metal hydroxide.

References Cited by the Examiner

UNITED STATES PATENTS

| | | | |
|---|---|---|---|
| 3,096,378 | 7/1963 | Leverling | 260—644 |
| 3,159,686 | 12/1964 | Burk et al. | 260—644 |

BENJAMIN R. PADGETT, *Primary Examiner.*

REUBEN EPSTEIN, LEON D. ROSDOL, *Examiners.*

L. A. SEBASTIAN, *Assistant Examiner.*